US012676141B2

(12) United States Patent
Ferreira et al.

(10) Patent No.: US 12,676,141 B2
(45) Date of Patent: Jul. 7, 2026

(54) FINGERPRINTING DATA TO DETECT VARIANCES

(71) Applicant: Advanced Micro Devices, Inc., Santa Clara, CA (US)

(72) Inventors: Ian Ferreira, Issaquah, WA (US); Miller Tracy, Seattle, WA (US); Eric Hullander, Edmonds, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 972 days.

(21) Appl. No.: 17/864,885

(22) Filed: Jul. 14, 2022

(65) Prior Publication Data

US 2023/0017644 A1     Jan. 19, 2023

Related U.S. Application Data

(60) Provisional application No. 63/221,900, filed on Jul. 14, 2021.

(51) Int. Cl.
| | |
|---|---|
| *G10L 15/01* | (2013.01) |
| *G06N 5/045* | (2023.01) |
| *G10L 21/10* | (2013.01) |

(52) U.S. Cl.
CPC ............... *G10L 15/01* (2013.01); *G06N 5/045* (2013.01); *G10L 21/10* (2013.01)

(58) Field of Classification Search
CPC .......... G10L 15/01; G10L 21/10; G06N 5/045

USPC .......................................................... 706/12
See application file for complete search history.

(56) References Cited

U.S. PATENT DOCUMENTS

| | | | |
|---|---|---|---|
| 9,582,080 B1 * | 2/2017 | Tilton | G06F 3/015 |
| 2022/0309391 A1 * | 9/2022 | Patel | G06F 16/906 |

OTHER PUBLICATIONS

Batista et al., "A study of the behavior of several methods for balancing machine learning training data", Sigkidd Explorations, vol. 6, Issue 1, p. 20, 2004 (Year: 2004).*
Naqa et al., "Machine learning and modeling: data, validation, communication challenges", American association of Physicists in medicine, 45(10), Oct. 2018 (Year: 2018).*
Brodley et al., "Identifying mislabeled training data", Journal of artificial intelligence research 11 (1999) 131-167, 1999 (Year: 1999).*

* cited by examiner

*Primary Examiner* — Tsu-Chang Lee
(74) *Attorney, Agent, or Firm* — Fishman Stewart PLLC

(57)     ABSTRACT

A system and method for characterizing the data used to train a model for machine learning inference. Training data and production data may both be fingerprinted, and the fingerprints may be compared to detect undesirable variances between training and production data. This may allow performance issues relating to differences in the training data set versus the production data set to be more easily identified. Parameters used for characterization can be determined based on the type of training data such as numerical data, image data, or audio data.

17 Claims, 5 Drawing Sheets

CREATE TRAINING MODEL USING MODEL TRAINING LIBRARY — 400

TRAIN MODEL USING TRAINING DATA SET — 410

COLLECT TELEMETRY DATA DURING TRAINING — 420

RECEIVE SELECTED OUTPUT FORMAT(S) FOR TELEMETRY DATA — 430

USE TRACKING LIBRARY TO TRANSLATE TELEMETRY DATA TO SELECTED OUTPUT FORMAT(S) — 440

OUTPUT TRANSLATED TELEMETRY DATA — 450

FINGERPRINTING DATA TO DETECT VARIANCES

CROSS-REFERENCE TO RELATED APPLICATION

This application claims the benefit of and priority to U.S. Provisional Patent Application Ser. No. 63/221,900, filed on Jul. 14, 2021, the disclosure of which is hereby incorporated by reference in its entirety as though fully set forth herein.

TECHNICAL FIELD

The present disclosure generally relates to fingerprinting data used in the context of machine learning.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Machine learning (ML) is increasing in popularity as computing power and data storage capabilities increase. For ML, data scientists will often create an inference model, train the model using a set of training data, and then deploy the trained model to production to perform inference on production data sets.

One problem that data scientists face is when a trained model does not perform as well as expected when it is deployed and operating on production data. A trained model that works well on a set of training data may not work well once deployed and operating on production data for a number of different reasons. It can be a difficult and time-consuming process to determine the root cause for why the trained model failed (e.g., not enough training data, wrong training data, wrong model, differences in the training versus production environment). For at least these reasons, a system and method for identifying issues with training data is desired.

Another issue faced by data scientists when training models is the difficulty associated with instrumentation and logging across different libraries, platforms, and utilities. For example, if a data scientist instruments with MLFlow, they generally have to use an MLFlow dashboard. Using a different backend is difficult and time consuming, and this problem is increasing as more data dashboard and logging solutions become available. As there are many different backends that have their own desirable features, there is a need for a solution that can create and output telemetry data to multiple backends automatically.

The foregoing discussion is intended only to illustrate examples of the present field and is not a disavowal of scope.

SUMMARY

By characterizing the training data set used to train a model, performance issues can be more easily identified once inference on production data is being performed. For example, if the set of training images that are used in training the model are all taken in the evening, the model may not be accurate when it is used to perform inference on a data set including images taken in the morning or midday hours. By characterizing and fingerprinting the training data set and the production data set, a data scientist can more easily detect problems relating to differences in the training data set and the production data set, rather than simply assuming the model needs to be changed.

A method for fingerprinting model training data is contemplated. In one embodiment, the method comprises determining a training data type, selecting a set of parameters based on the training data type, characterizing a training data set, and creating a training data fingerprint based on the characterization of the training data set. The model may be trained using the training data set, and the trained model may be used for inference against a production data set. The production data set may be characterized using the same selected set of parameters, and a production data fingerprint may be created based on the characterization of the production data set. The training data fingerprint and the production data fingerprint may be compared. If the variance between the training data fingerprint and the production data fingerprint are different (e.g., greater than a predetermined threshold), an alert may be created.

In some embodiments, the characterizing may be performed during the training, and the predetermined threshold is determined based on the training data type. For example, the set of parameters for numeric data may comprise one or more of the minimum value, maximum value, Z-score, mean and median. In some embodiments, the set of parameters for image data may for example comprise one or more of red green blue histograms (RGB histograms), greyscale histograms, and auto decoder feature histograms. In some embodiments, the set of parameters for audio data may comprise an FFT-generated spectrogram. The FFT-generated spectrogram may in turn be characterized as image data.

A method for translating model training telemetry data is also contemplated. In one embodiment, the method comprises creating a training model using a model training library, training the training model using a training data set, and collecting telemetry data during the training. One or more target output formats for telemetry data are received, and the telemetry data is translated and may be output and logged using a tracking library to the one or more target output formats. The target output formats may be different than the output format of the model training library, and the translating may be performed during the training in real-time or near real-time. For example, an MLFlow training model may be used, and the output may be to MLFlow or Tensorboard (a machine learning utility for visualizing data), or both, and the translated telemetry data may be logged to Grafana (a logging and dashboard utility) and or Prometheus (an event monitoring utility).

These methods may for example be implemented as a non-transitory, computer-readable storage medium storing instructions executable by a processor of a computational device, which when executed cause the computational device to perform the method. The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
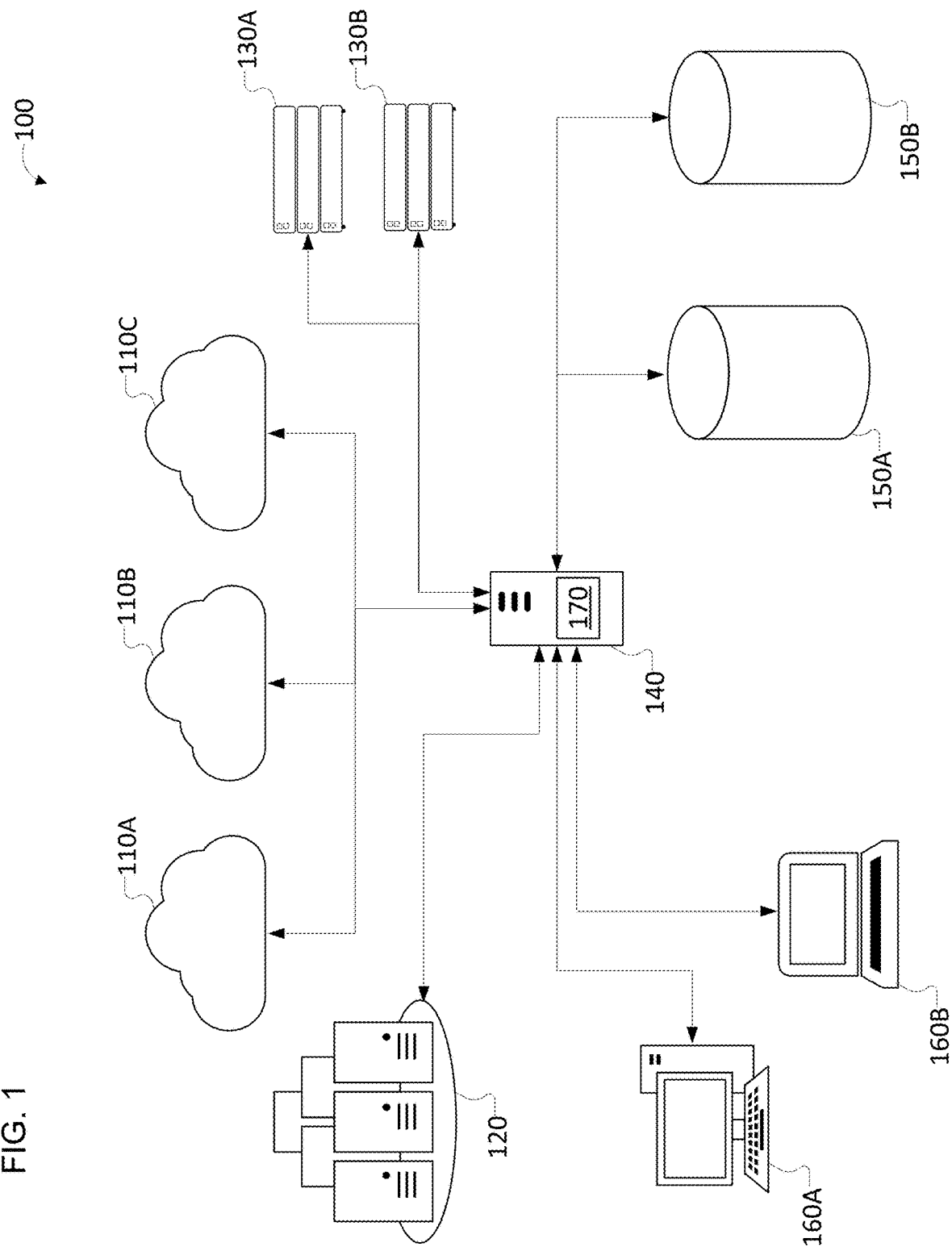
FIG. 1 is a schematic view generally illustrating an example embodiment of a distributed computing system according to teachings of the present disclosure.

Turning now to FIG. 1, an example embodiment of a distributed computing system 100 according to teachings of the present disclosure is shown. In this example, the distributed computing system 100 is managed by a management server 140, which may for example provide access to the distributed computing system 100 by providing a platform as a service (PAAS), infrastructure as a service (IAAS), or software as a service (SAAS) to users. Users may access these PAAS/IAAS/SAAS services from their user devices 160A-B such as on-premises network-connected PCs, workstations, or servers and laptop or mobile devices via a web interface.

Management server 140 is connected to a number of different computing devices via local or wide area network connections. This may include, for example, cloud computing providers 110A, 110B, and 110C. These cloud computing providers may provide access to large numbers of computing devices (often virtualized) with different configurations. For example, systems with one or more virtual CPUs may be offered in standard configurations with predetermined amounts of accompanying memory and storage. In addition to cloud computing providers 110A, 110B, and 110C, management server 140 may also be configured to communicate with bare metal computing devices 130A and 130B (e.g., non-virtualized servers), as well as a datacenter 120 including for example one or more supercomputers or high-performance computing (HPC) systems (e.g., each having multiple nodes organized into clusters, with each node having multiple processors and memory), and storage systems 150A and 150B. Bare metal computing devices 130A and 130B may for example include workstations or servers optimized for machine learning computations and may be configured with multiple CPUs and GPUs and large amounts of memory. Storage systems 150A and 150B may include storage that is local to management server 140 and well as remotely located storage accessible through a network such as the internet. Storage systems 150A and 150B may comprise storage servers and network-attached storage systems with non-volatile memory (e.g., flash storage), hard disks, and even tape storage.

Management server 140 is configured to run a distributed computing management application 170 that receives jobs and manages the allocation of resources from distributed computing system 100 to run them. Management application 170 is preferably implemented in software (e.g., instructions stored on a non-volatile storage medium such as a hard disk, flash drive, or DVD-ROM), but hardware implementations are possible. Software implementations of management application 170 may be written in one or more programming languages or combinations thereof, including low-level or high-level languages. The program code may execute entirely on the management server 140, partly on management server 140 and partly on other computing devices in distributed computing system 100.

The management application 170 may be configured to provide an interface to users (e.g., via a web application, portal, API server or command line interface) that permits users and administrators to submit applications/jobs via their user devices 160A-B, and mobile devices, designate the data sources to be used by the application, designate a destination for the results of the application, and set one or more application requirements (e.g., parameters such as how many processors to use, how much memory to use, cost limits, application priority, etc.). The interface may also permit the user to select one or more system configurations to be used to run the application. This may include selecting a particular bare metal or cloud configuration (e.g., use cloud A with 24 processors and 512 GB of RAM).

Management server 140 may be a traditional PC or server, a specialized appliance, one or more nodes within a cluster (e.g., running with a virtual machine or container). Management server 140 may be configured with one or more processors (physical or virtual), volatile memory, and non-volatile memory such as flash storage or internal or external hard disk (e.g., network attached storage accessible to management server 140).

Management application 170 may also be configured to receive computing jobs from user devices 160A-B, determine which of the distributed computing system 100 computing resources are available to complete those jobs, make recommendations on which available resources best meet the user's requirements, allocate resources to each job, and then bind and dispatch the job to those allocated resources. In one embodiment, the jobs may be configured to run within containers (e.g., Kubernetes with Docker containers, or Singularity) or virtualized machines on the distributed computing system 100. Kubernetes is an open-source system for automating deployment, scaling, and management of containerized applications. Singularity is a container platform popular for high performance workloads such as artificial intelligence and machine learning.

Figure 2:
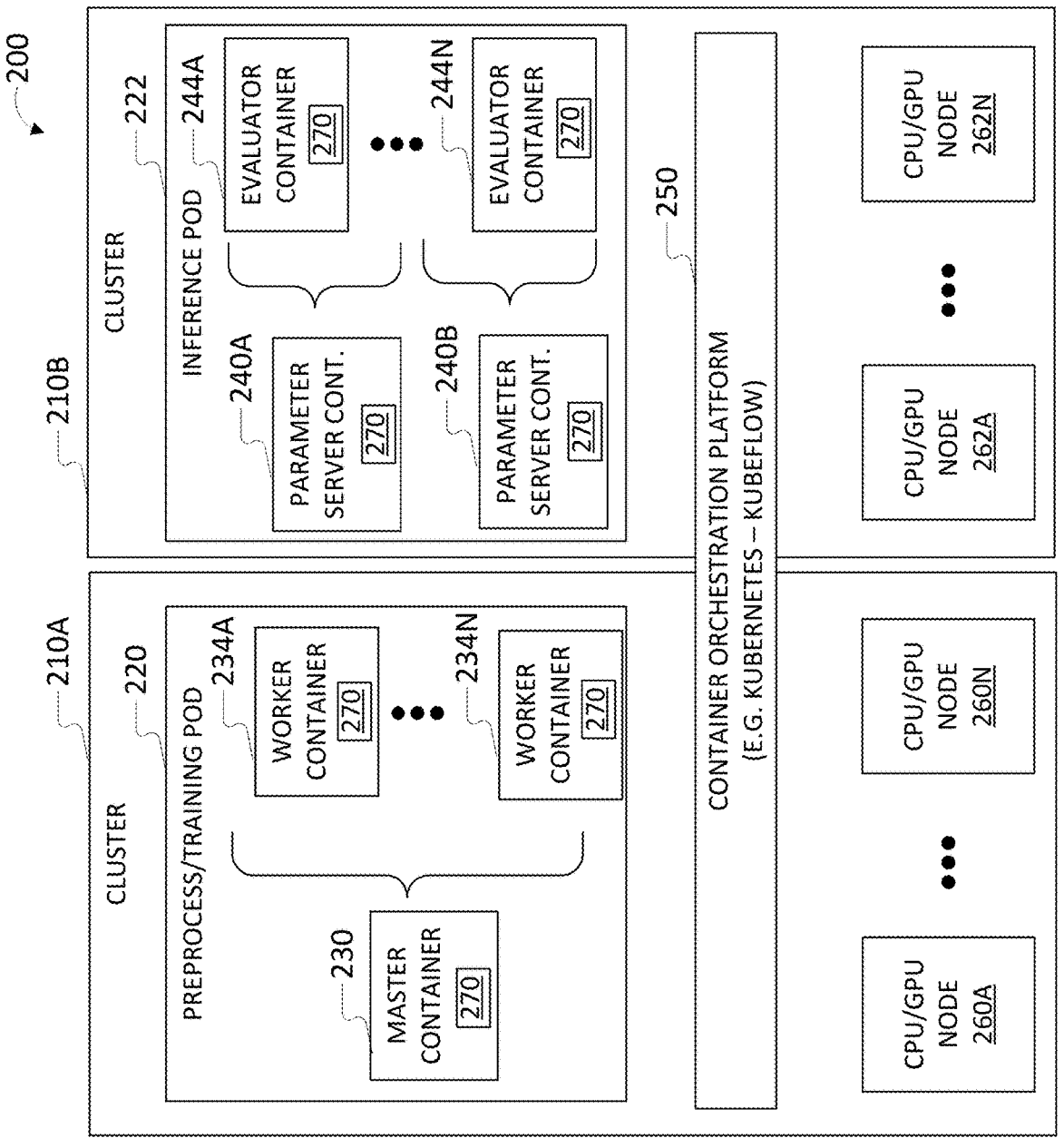
FIG. 2 is a schematic view generally illustrating another example embodiment of a distributed computing system for machine learning according to teachings of the present disclosure.

Turning now to FIG. 2, a schematic view generally illustrating another example embodiment of a distributed computing system 200 according to teachings of the present disclosure is shown. In this embodiment, the system comprises one or more clusters 210A-B. Each cluster is capable of executing one or more pods 220-222, and each pod 220-222 is capable of executing one or more containers, such as containers 230, 234A-N, 240A-B, and 244A-N. The containers are managed by a container orchestration platform 250 (such as Kubernetes or Kubeflow) which allocates resources from one or more nodes, such as compute nodes 260A-N and 262A-N. The container orchestration platform 250 may allocate and schedule the pods/containers to resources including compute nodes (e.g., CPU/GPU), storage nodes, I/O, etc. The resources and nodes may be part of multiple clusters 210A-B, and they may be distributed across different physical systems (e.g., different servers) and physical locations.

In this example, a user has specified a particular application to run that has multiple components with multiple roles, including master and worker (used in this example for preprocessing and training within pod 220), and parameter server and evaluator (used in this example for performing inference, a common task in artificial intelligence and machine learning, within pod 222). This is merely one example, and other configurations are possible and contemplated (e.g., each container could be in its own pod). In this example, the worker containers 234A-N are managed by master container 230, and the evaluator containers 244A-N are managed by parameter server containers 240A-B, respectively. In some embodiments, each container may be configured with a bootstrap module 270 that configures the container. In other embodiments, the bootstrap module 270 may be part of the pod rather than the container. In yet other embodiments, the bootstrap module may be part of both pods and containers, or there may be a pod bootstrap module and a container bootstrap module. In some embodiments, bootstrap module 270 may for example be implemented as a set of shell scripts that are configured to automatically run when the container or pod is started.

Figure 3:
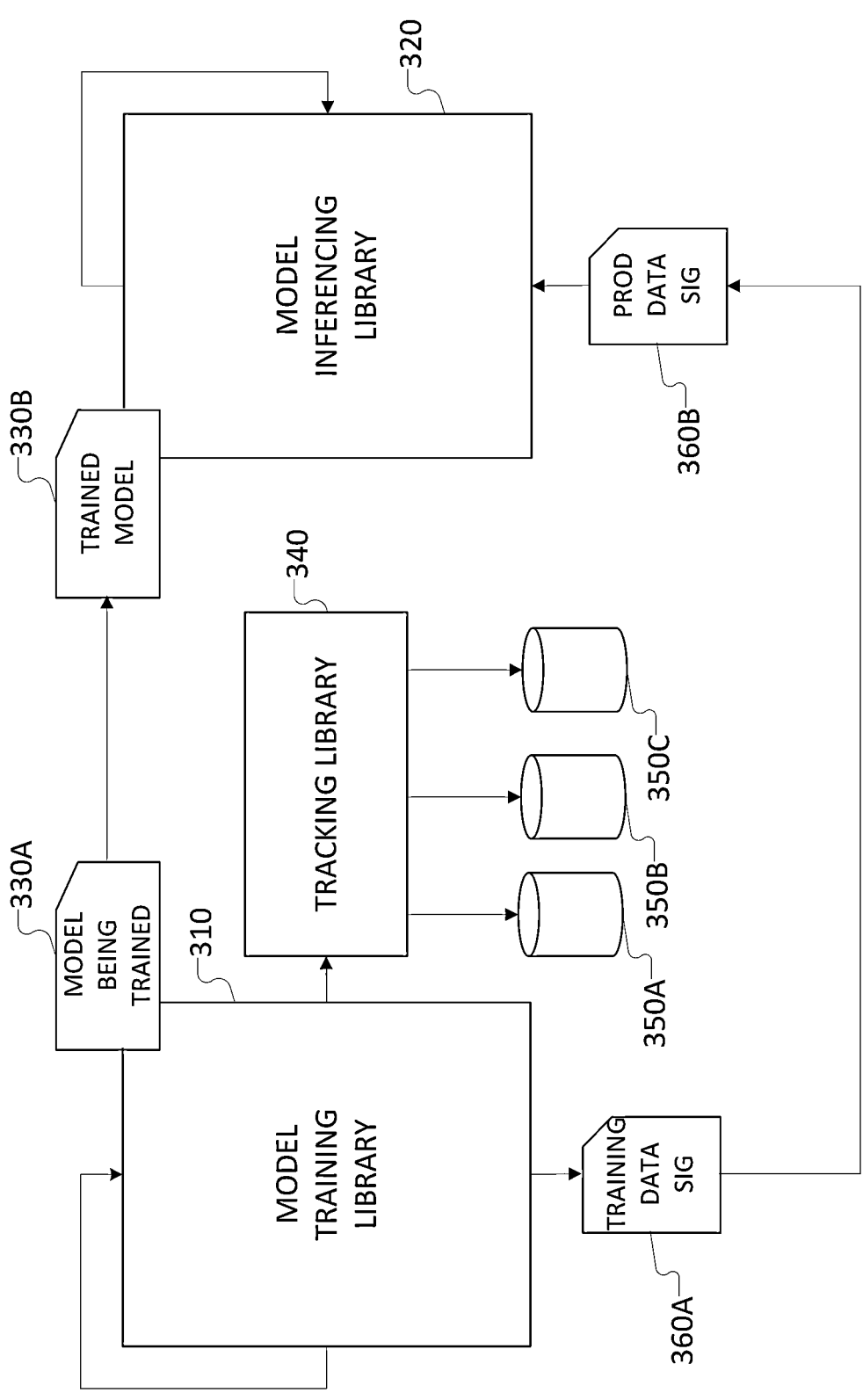
FIG. 3 is a diagram generally illustrating an example system for fingerprinting training data in machine learning according to teachings of the present disclosure.

Turning now to FIG. 3, a diagram generally illustrating an example system for fingerprinting training data in machine learning according to teachings of the present disclosure is shown. In this embodiment, two model libraries are used. the first is model training library 310, which is used to create and train an inference model 330A. One example of such a model training library 310 is MLFlow, An open source library for managing the life cycle of machine learning experiments.

In some embodiments, model training library 310 may be configured to write telemetry to tracking library 340 which in turn saves the telemetry data to one or more different backends 350A-C (e.g., Grafana). Tracking library 340 permits data to be written in whatever format the user chooses. For example, tracking library may write to Tensorboard or MLFlow and log telemetry data to Grafana and Prometheus. This may simplify the process for data scientists, who may simply use the tracking library and specify one or multiple different telemetry targets, with the tracking library 340. In some embodiments, tracking library 340 may be an integrated part of model training library 310.

The model training library 310 may also be configured to characterize the training data used to train the inference model 330A. The characterization may be based on a set of parameters that are selected based on the training data type. In some embodiments, the characterizing may be performed during the interactive training, and the predetermined threshold is determined based on the training data type. For example, the set of parameters for numeric data may comprise one or more of the minimum value, maximum value, Z-score, mean and median. The set of parameters for image data may for example comprise one or more of RGB (red greed blue) histograms, greyscale histograms, and auto decoder feature histograms and the set of parameters for audio data may comprise an FFT-generated spectrogram. The FFT-generated spectrogram may in turn be characterized as image data.

The characterization may be combined (e.g., appended together) to create a training data fingerprint or signature 360A. The training data set fingerprint may be based on the characterization of the training data set. The model may be trained using the training data set, and the trained model 330B may be used for inference against a production data set. The production data set may be characterized using the selected set of parameters (e.g., during an iterative inference process performed on the production data), and a production data fingerprint or signature 360B may be created based on the characterization of the production data set. The training data fingerprint or signature 360A and the production data fingerprint or signature 360B may be compared (e.g., by model inferencing library 320). If the variance between the training data fingerprint and the production data fingerprint are greater than a predetermined threshold, an alert may be created.

Figure 4:
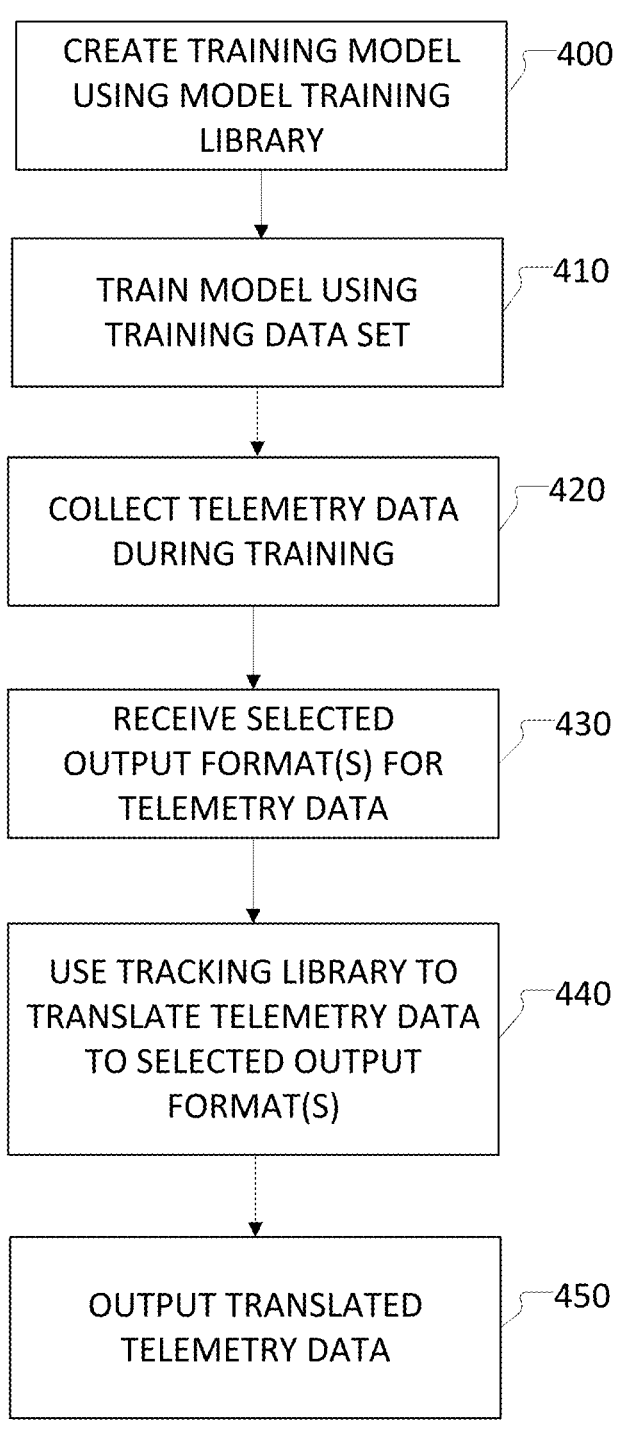
FIG. 4 is a flow diagram generally illustrating an example method for translating model training telemetry data according to teachings of the present disclosure.

Turning now to FIG. 4, a flow diagram generally illustrating an example method for translating model training telemetry data according to teachings of the present disclosure is shown. In this embodiment, a training model is created using a model training library (step 400). An inference model is trained using a training data set (step 410). telemetry data is collected during training (step 420), and a set of one or more selected output formats for the telemetry data is received (step 430). A tracking library is used to automatically translate the received telemetry data into the one or more selected output formats (step 440). The translated telemetry data is then output to the desired destination such as a file or database (step 450). In some embodiments, the same process may be used to output captured telemetry data for production inference instead of, or in addition to, training telemetry data.

Figure 5:
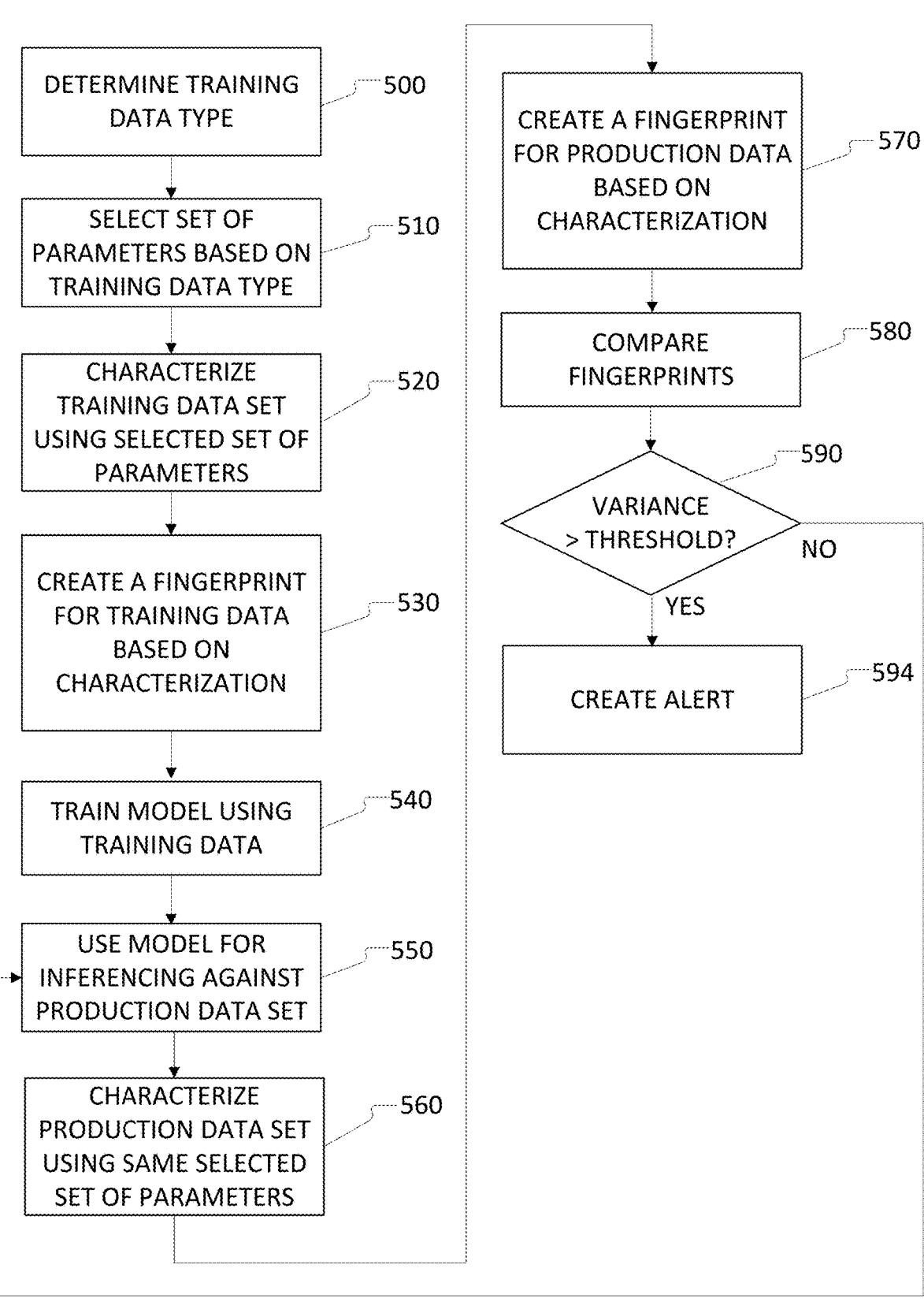
FIG. 5 is a flow diagram generally illustrating an example method for fingerprinting model training data according to teachings of the present disclosure.

Turning now to FIG. 5, a flow diagram generally illustrating an example method for fingerprinting model training data according to teachings of the present disclosure is shown. In this embodiment, the type of training data is determined (step 500). For example, the training data may be examined to determine if it is numerical, alphanumerical, audio, still image, or video data. Based on the determined type of training data, a set of parameters may be selected corresponding to the type of training data (step 510). For example, the set of parameters for numeric data may comprise one or more of the minimum value, maximum value, Z-score, mean and median. The set of parameters for image data may for example comprise one or more of RGB (red greed blue) histograms, greyscale histograms, and auto decoder feature histograms and the set of parameters for audio data may comprise an FFT-generated spectrogram. The FFT-generated spectrogram may in turn be characterized as image data. Other parameters are possible and contemplated.

The training data set may then be characterized using these selected set of parameters (step 520). A signature (also referred to herein as a fingerprint) may be created based on the characterization (step 530). For example, in some embodiments the different parameters may be appended to create a signature or fingerprint. In other embodiments, the different parameters may be weighted and combined.

The inference model is trained using the training data (step 540). This is an iterative process, and in some embodiments the characterization of the training data set may be performed while the inference model is being trained. In other embodiments, the characterization of the data set may be performed before or after the training of the model is performed.

The trained model is used for inference against a production data set (step 550). The production data set may also be characterized (step 560) using the same selected set of parameters that were used to characterize the training data set. This characterization may be used to create a fingerprint or a signature for the production data (step 570). The two fingerprints or signatures maybe compared (step 580). If they are different or in some embodiments if they vary by more than a predetermined threshold (step 590), an alert is created (step 594) to inform the user that the production data set may vary significantly from the training data set. This indicates to the user that they should review and possibly update their training data set to better match the production data set.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method for fingerprinting model training data by at least one processor, the method comprising the steps of:

creating, by the at least one processor, a training data fingerprint of a machine learning (ML) training data set in response to characterizing the ML training data set using a set of parameters, the set of parameters being selected based on a training data type of the ML training data set;

training, via ML, an ML inference model using the ML training data set to create a trained ML inference model;

ML inferencing on a production data set using the trained ML inference model;

creating, by the at least one processor, a production data fingerprint in response to characterizing the production data set using the set of parameters;

comparing, via the at least one processor, the production data fingerprint and the training data fingerprint to determine if a variance exists between the production data fingerprint and the training data fingerprint, wherein the variance indicates a performance issue of the ML inferencing associated with differences between the production data set and the ML training data set.

2. The method of claim 1, wherein characterizing the ML training data set is performed during the training of the ML inference model.

3. The method of claim 1, further comprising creating an alert in response to the variance between the training data fingerprint and the production data fingerprint being greater than a predetermined threshold.

4. The method of claim 3, wherein the predetermined threshold is determined based on the training data type.

5. The method of claim 1, wherein the set of parameters is for a set of numeric data which comprise one or more of the following: minimum value, maximum value, Z-score, mean and median.

6. The method of claim 1, wherein the set of parameters is for a set of image data which comprise one or more of the following: RGB histograms, greyscale histograms, and auto decoder feature histograms.

7. The method of claim 1, wherein the set of parameters is for a set of audio data which comprise an FFT-generated spectrogram.

8. The method of claim 7, wherein the FFT-generated spectrogram is characterized as image data.

9. A system having at least one processor, the system configured to:

create, by the at least one processor, a training data fingerprint of a machine learning (ML) training data set in response to characterization of the ML training data set using a set of parameters, the set of parameters being selected based on a training data type of the ML training data set;

train, via ML, an ML inference model using the ML training data set to create a trained ML inference model;

ML inference on a production data set using the trained ML inferencing model; inference on a production data set;

create, by the at least one processor, a production data fingerprint in response to characterization of the pro- duction data set using the set of parameters;

compare, via the at least one processor, the production data fingerprint and the training data fingerprint to determine if a variance exists between the production data fingerprint and the training data fingerprint, wherein the variance indicates a performance issue of the ML inference associated with differences between the production data set and the ML training data set.

10. The system of claim 9, wherein characterization the ML training data set is performed during the training of the ML inference model.

11. The system of claim 9, further configured to: create an alert in response to the variance between the training data fingerprint and the production data fingerprint exceeding a predetermined threshold.

12. The system of claim 11, wherein the predetermined threshold is determined based on the training data type.

13. The system of claim 9, wherein the set of parameters is for a set of numeric data which comprise one or more of the following: minimum value, maximum value, Z-score, mean and median.

14. The system of claim 9, wherein the set of parameters is for a set of image data which comprise one or more of the following: RGB histograms, greyscale histograms, and auto decoder feature histograms.

15. The system of claim 9, wherein the set of parameters is for a set of audio data which comprise an FFT-generated spectrogram.

16. A server comprising at least one processor, the server configured to:

create, by the at least one processor, a training data fingerprint of a machine learning (ML) training data set in response to characterization of the ML training data set using a set of parameters, the set of parameters being selected based on a training data type of the ML training data set;

train, via ML, an ML inference model using the ML training data set to create a trained ML inference model;

ML inference on a production data set using the trained ML inferencing model; inference on a production data set;

create, by the at least one processor, a production data fingerprint in response to characterization of the pro- duction data set using the set of parameters;

compare, via the at least one processor, the production data fingerprint and the training data fingerprint to determine if a variance exists between the production data fingerprint and the training data fingerprint, wherein the variance indicates a performance issue of the ML inference associated with differences between the production data set and the ML training data set.

17. The server of claim 16, further configured to: create an alert in response to the variance between the training data fingerprint and the production data fingerprint exceeding a predetermined threshold.

* * * * *